United States Patent [19]
Retzer

[11] Patent Number: 5,737,369
[45] Date of Patent: Apr. 7, 1998

[54] APPARATUS AND METHOD FOR RECOVERING DATA IN THE PRESENCE OF ERROR TRANSIENTS

[75] Inventor: Michael Herbert Retzer, Palatine, Ill.

[73] Assignee: Motorola, Inc., Schaumburg, Ill.

[21] Appl. No.: 608,230

[22] Filed: Feb. 28, 1996

[51] Int. Cl.[6] .................................................. H04B 1/10
[52] U.S. Cl. .......................................... 375/346; 455/296
[58] Field of Search .............................. 375/346, 316, 375/317, 326; 455/296; 327/310

[56] References Cited

U.S. PATENT DOCUMENTS 5,652,541  7/1997  Yang et al. ........................ 375/346

*Primary Examiner*—Temesghen Ghebretinsae
*Attorney, Agent, or Firm*—Donna Rogers Maddox

[57] ABSTRACT

An apparatus and method for recovering data in the presence of error transients is disclosed that includes a received waveform containing an information signal encoded at periodic time instants of a known period for eliminating an undesired amplitude error in the received waveform, where the error is slowly varying with respect to the known periods and recovering the desired periodic time instants. A delay element for delaying the received waveform by an amount equal to the period is included and a subtracting element for comparing the received waveform with the delayed waveform, and providing a timing recovery signal with zero crossing substantially less corrupted by the undesired amplitude error, and an averaging circuitry operating on the timing recovery signal for purposes of recovering the desired periodic time instants aids in recovering data in the presence of error transients.

9 Claims, 5 Drawing Sheets

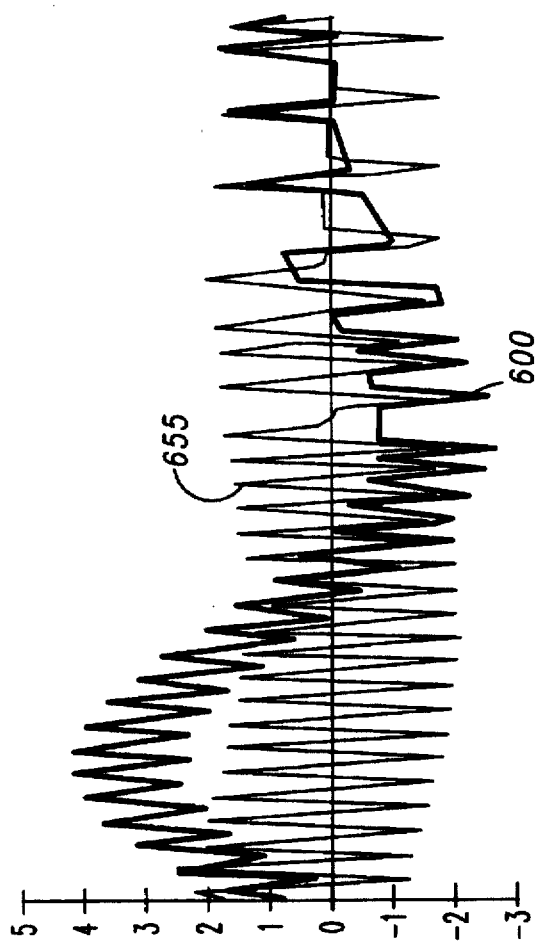
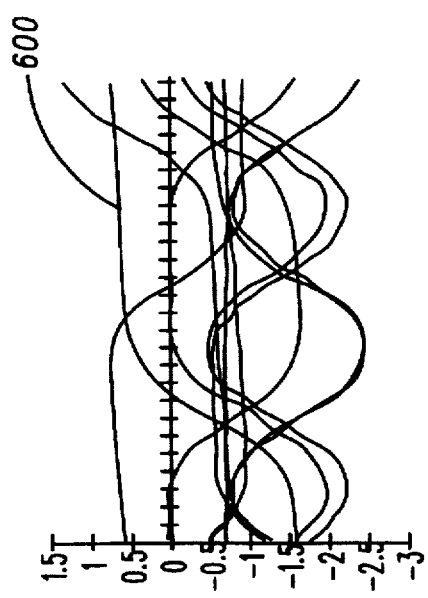

APPARATUS AND METHOD FOR RECOVERING DATA IN THE PRESENCE OF ERROR TRANSIENTS

FIELD OF THE INVENTION

This invention deals with data signal demodulation and more specifically but not limited to eliminating error transients in a radio frequency received data signal.

BACKGROUND OF THE INVENTION

The need for efficient, low cost, data communications continues to increase, not only in the traditional applications of cabled or microwave high speed telecommunications and local or wide area computer networks, but in the emerging applications of personal communications of data or digitized voice from handheld wireless devices. These wireless devices employ a variety of techniques and technologies to implement data communications, including but not limited to, radio and infrared. These media, as compared with traditional wired data systems, offer increased challenges to the designer, principally because of relatively narrow available information bandwidths and additive systematic or random errors. Furthermore, these personal data systems will often, but not necessarily, be packet implementations, where the media is time shared between a number of devices each sending relatively short bursts of data. In packet data systems there are design tradeoffs between the overhead carried in each packet for synchronization, the amount of actual information carried in each packet, and the reliability of receiving the information without error. The invention described here offers a way to improve the reliability of correctly receiving the transmitted data given systematic transient errors introduced into the data waveform.

In data communications systems with limited information bandwidth it is well known that some sort of Non-Return to Zero (NRZ) modulation scheme offers the optimum steady state performance throughput. In these NRZ schemes, or derivative similar schemes, the information is encoded as some offset from known reference levels. This could be, for example, a voltage value that is greater than some reference could represent a data value of 1, and less than some reference could represent a data value of 0. Similarly, the reference could be a nominal value of frequency, with greater frequency values representing a data value of 1, and lesser frequency values representing a data value of 0. Other techniques of data communication similarly exist, where the data information is encoded as the value of some physical property relative to some reference value; this could be voltage or frequency as used in these examples, or alternatively, light intensity, sinusoidal phase angle, or other similar physical measurable property.

Complex information can thus be encoded into some physical waveform by varying the waveform over time relative to the fixed reference level. Generally for data communications systems the time variability of the encoded waveform is handled in a strictly periodic manner. A fixed rate clock is established at the sending terminal, and relative to this clock the encoded waveform will be stable relative to the fixed reference during precisely known periodic intervals. At these stable instants, the value of the waveform relative to the reference level is indicative of the information data value. At times other than these precisely known periodic intervals, the waveform may be in transition towards the next stable value relative to the fixed reference. This leads to the concept of an "eye pattern" whereby the superposition of many encoded waveforms, each precisely synchronized to the periodic clock, will define identifiable regions relative to the fixed reference level which can be interpreted as the encoded data values. The degree in any particular data communications system to which precisely identified regions can be decerned in the eye pattern is a measure of the success of that communications system in accurately conveying the information data.

The task of a data receiver in systems such as this is to recover the encoded data information by making a comparison of some physical measurement relative to some reference level. This task is twofold; the receiver must establish an estimate of the reference level in order to make comparisons with the received waveform, and the receiver must establish an estimate of time synchronization with the periodic sending terminal clock in order to measure the waveform in the stable instants indicative of the information data. In traditional wired systems, both the reference level and the time synchronization instants can often be a fixed unchanging values, which makes the determination at the receiver an easy task. In many wireless, and some wired, systems, however, the determination of the reference level and the timing instants must be made at the receiver by some sort of averaging over intervals of the received physical values. This determination is necessary because of systematic channel impairments, such as attenuation, carrier frequency offset, error transients, voltage offset, etc., which preclude fixed references and timing. For example, in typical radio frequency implementations, the reference and timing will vary with carrier frequency errors, and furthermore these errors may be different between each unique transmitter/receiver pair, necessitating some rapidly adaptive scheme for reference and timing recovery. Various techniques exist for the rapid estimation of reference level at the data receiver.

Various phenomena at the transmitter or receiver will introduce undesired transients at the beginning of the data waveform, making the process of determining the reference level and time synchronization difficult. Some of these methods include, but are not limited to, transmitter load pull, power ramping delays, and low frequency settling. Load pull is a phenomena whereby the nominal frequency of an RF generator is momentarily deflected from its desired value. Mechanisms causing this deflection can include initial increased current drain from the battery supply, phase discontinuity at the phase-locked-loop phase detector due to changing RF feedback leakage, component heating, or others. Power ramping delays, or slow turn-on of the transmitter, can distort the transmitted waveform at the begging of the transmission. Any DC offset, or overall average value offset, of the transmitted waveform will also lead to waveform distortion due to insufficient low frequency response. All of these phenomena have in common the characteristic of an initial transient distortion of the data waveform, which settles out over time.

In packet data systems in general, and specifically with the Cellular Digital Packet Data (CDPD) reverse channel, it is necessary for a receiver to be able to rapidly recover and decode the data bits in the presence of unknown delays and keyup transients. Generally a long "dotting sequence" is prepended to the transmitted packet in order to allow these undesirable transients to die out, and to provide a known, predictable waveform from which to establish timing synchronization. Generally a receiver needs to make an accurate estimate of the reference level and timing during this dotting sequence. Lengthening this sequence is undesirable as it decreases overall system throughput. Tightening the specification and reducing the load pull transient at the transmitter becomes prohibitively expensive. Techniques are known which attempt to quickly establish a center slice, for example, "DC Restoration Amplifier with Automatic Zero Offset Adjustment", Chapman, U.S. Pat. No. 3,846,710. These methods work, but in cases of severe transient distortion but do not have the robustness to handle large amounts of error "ringing" lasting into the actual wordsync portion of the packet.

Clearly a need exists for a method and apparatus that recovers packet data in the presence of error transients.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

FIG. 6 shows the output of the differential timing recovery subsystem of FIG. 4 superimposed on a received demodulated data waveform with a large amount of transient error distortion, illustrating the effectiveness of the present invention in identifying the zero crossing timing synchronization with even very large amounts of transient error distortion.

FIG. 7 is an eye pattern depiction of the severely distorted received demodulated waveform of FIG. 6 in the region of the wordsync interval, illustrating that without the use of the present invention the timing and level information in the received waveform is completely obscured by the transient error distortion.

DETAILED DESCRIPTION OF A PREFERRED EMBODIMENT

Figure 1:
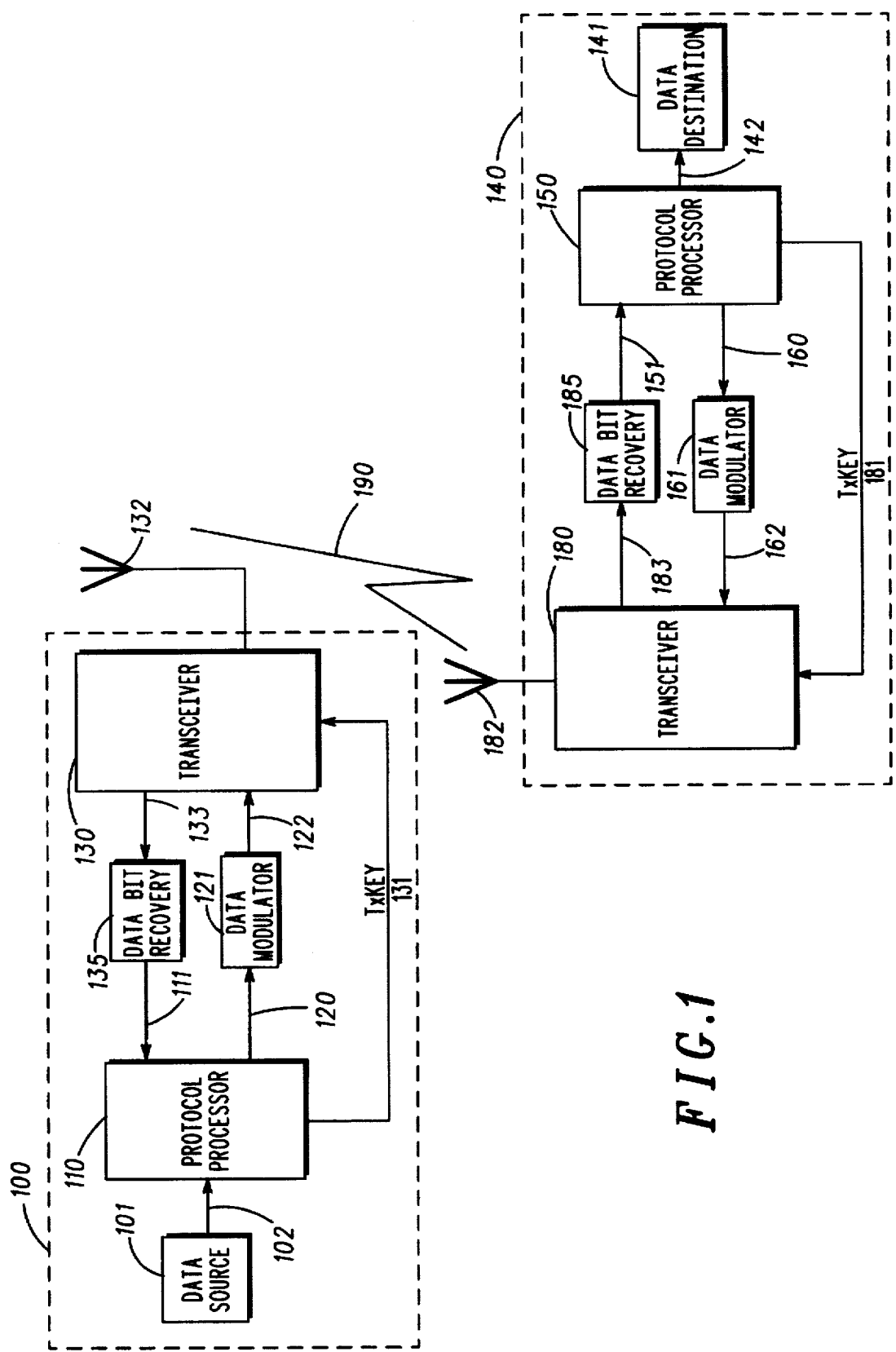
FIG. 1 is a representative diagram of a data communications system operating in accordance with the present invention.

Referring to FIG. 1 a representative diagram of a data communications system is depicted. The system consists of a Sending Terminal (100), a Receiving Terminal (140), and the Media (190), here being depicted as a wireless radio frequency channel, but could in other embodiments consist of an infrared channel or other technology. Each of the Sending Terminal (100) and Receiving Terminal (140) may have the capability of transmitting or receiving data messages over the wireless Media (190), but in the general case the communications may be unidirectional. In this depiction information data will be sent from a Data Source (101) in the Sending Terminal (100) to the Receiving Terminal (140), finally ending up at the Data Destination (141). The Data Source (101) and Data Destination (141) pass their respective information data to and from Protocol Processors (110, 150) over some Information Interfaces (102, 142). It is the function of the Protocol Processors (110, 150) to assure that the information data sent from the Data Source (101) is correctly received at the Data Destination (141). As part of their operation, the Receiving Terminal Protocol Processor (150) may need to detect errors in the received data, and signal the Sending Terminal Protocol Processor (110) that the data has been received correctly or not.

The Protocol Processors (110, 150) handle the formatting of Transmit Link Data Frames (at 120) and Transmit Link Control Frames (at 160) to the Data Modulators (121, 161). The Protocol Processors (110, 150) utilize control means (131, 181) to control the keying of the Transceivers (130, 180). Data Modulators (121, 161) perform any processing operations on the Transmit Link Data Frames (120) and Transmit Link Control Frames (160) needed to effectively transmit the frames over the Media (190), these processing operations may include but are not limited to bandpass filtering, waveshaping, pre-emphasis filtering, amplitude or angle modulation, etc., which are common methods well known in the art. The output of the Data Modulators (121, 161) are sent over interfaces (12:2, 162) to Transceivers (130, 180) for transmission over the Media (190). Transceivers (130, 180) handle the actual transmission and reception of the processed frames over the Media (190), using suitable Antennas (132,182). This embodiment depicts a radio frequency wireless radio frequency Media (190), so the Transceivers (130, 180) and Antennas (132, 182) are suitable for this radio frequency media, but could just as well employ infrared or other technologies suitable to other medias. It should also be appreciated by those skilled in the art that the Data Modulator blocks (121, 161) may reside as blocks separate from the Transceivers (130, 180), with distinct interfaces (122, 162) as shown in this embodiment, or be incorporated internally to the respective Transceivers.

Signals received from the Media (190) using Antennas (182, 132) are processed by Transceiver receivers (180, 130) and sent (over 183, 133) to Data Bit Recovery processors (185, 135). The Data Bit Recovery processors (185, 135) attempt to correctly estimate the received Link Data Frames and Link Control Frames, and pass the estimated received frames (over 151 and 111) to the Protocol Processors (150, 110).

Data flow through this data communications system originates at the Sending Terminal (100) with information data at The Data Source (101). This information data is formatted into Transmit Link Data Frames in Protocol Processor (110), processed in the Data Modulator (121), and transmitted by the Transceiver (130) through Antenna (132) over the Media (190). It is received by the Receiving Terminal (140) through Antenna (182), and is processed by Data Bit Recovery processor (185). The resulting Receive Link Data Frames are processed by Protocol Processor (150), with the received information data passed to the Data Destination (141). In response to Receive Data Link Frames, the Receiving Terminal Protocol Processor (150) will generate Transmit Link Control Frames used as feedback to the Sending Terminal Protocol Processor (110) that the information data has, or has not, been received correctly. These Transmit Link Control Frames are generated by the Receiving Terminal Protocol Processor (150), are processed by Data Modulator (161), and transmitted by Transceiver (180), out Antenna (182), over the Media (190). The Transmit Link Control Frames are received by Antenna (132) coupled to Transceiver (130), are processed by Data Bit Recovery processor (135), and passed to Protocol Processor (110), where they are used to signal success or failure of the information data transfer.

Figure 2:
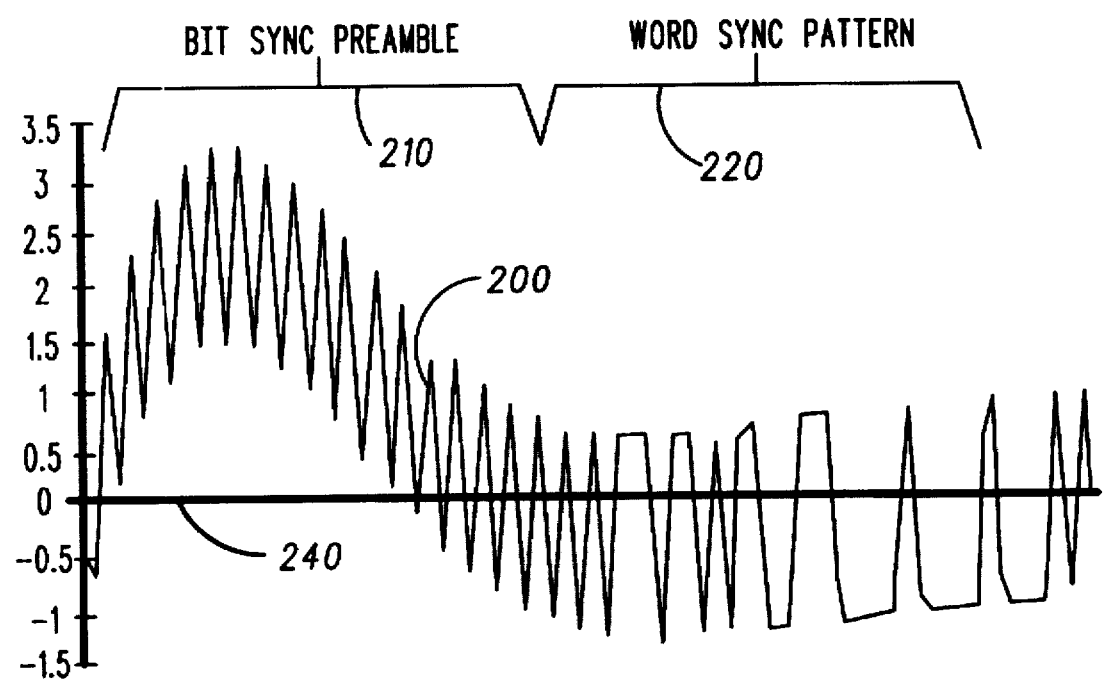
FIG. 2 is a representative depiction of a received demodulated data waveform with a moderate amount of transient error distortion, showing the type of impairment addressed by the present invention.
Figure 3:
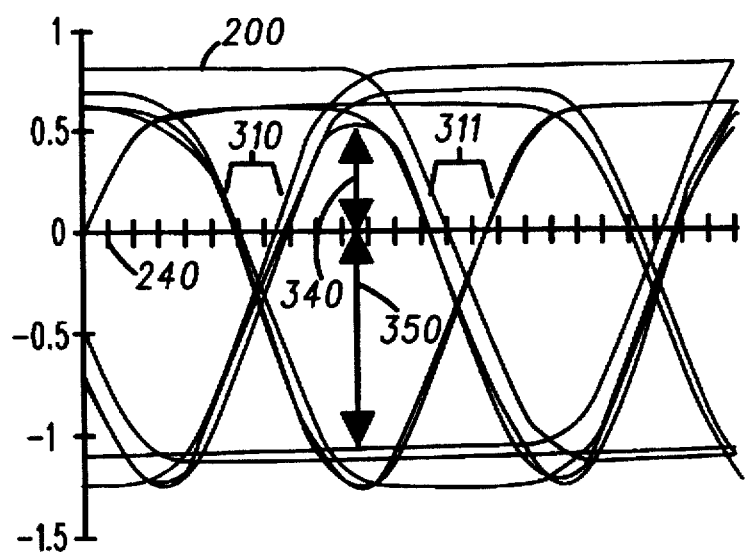
FIG. 3 is an eye pattern depiction of the received waveform of FIG. 2, formed by periodically superimposing sections of FIG. 2 near the wordsync interval, showing the moderate degradation in the eye opening caused by the transient error distortion.

FIG. 2 depicts a representative received data waveform (200) present at the output of the Receiving Terminal (140) Transceiver (180 at 183). In this example, the waveform depicted is representative of that which may be used in a typical packet data system, with some well controlled pattern for the purpose of allowing the receiver to rapidly acquire bit synchronization (210), and some well defined word sync pattern (220) to allow the receiver protocol processor to identify the frame boundaries. In this example, the bitsync pattern is that of alternating 1's and 0's, and is located at the beginning of the waveform, followed by the wordsync pattern, but this exact structure does not infer any limitations on the present invention. The ideal reference level (240) shown in this drawing represents the ideal midpoint reference for the received data waveform minus any error due to the transient distortion. It can be appreciated that because of the transient distortion this ideal reference level does not correspond well with the actual center of the received waveform in the region of the word sync pattern. The distortion in the received waveform can be further appreciated in reference to FIG. 3, which depicts an eye pattern of the received waveform obtained by periodically superimposing sections of the received waveform (200) in the vicinity of the word sync pattern (220). The ideal reference level (240) is also shown on FIG. 3. The difficulty in accurately recovering data from such a distorted reception can be appreciated by noting the amount of zero crossing jitter (at 310 and 311), and by the amount of asymmetry in the stable region above and below the reference level (340 and 350). This zero crossing jitter affects the accuracy of the recovered clock estimate. The ability to accurately recover the correct waveform level in the stable region above and below the reference level, has already been degraded by the distortion asymmetry, and is further degraded by this jittering in the clock estimate.

Figure 4:
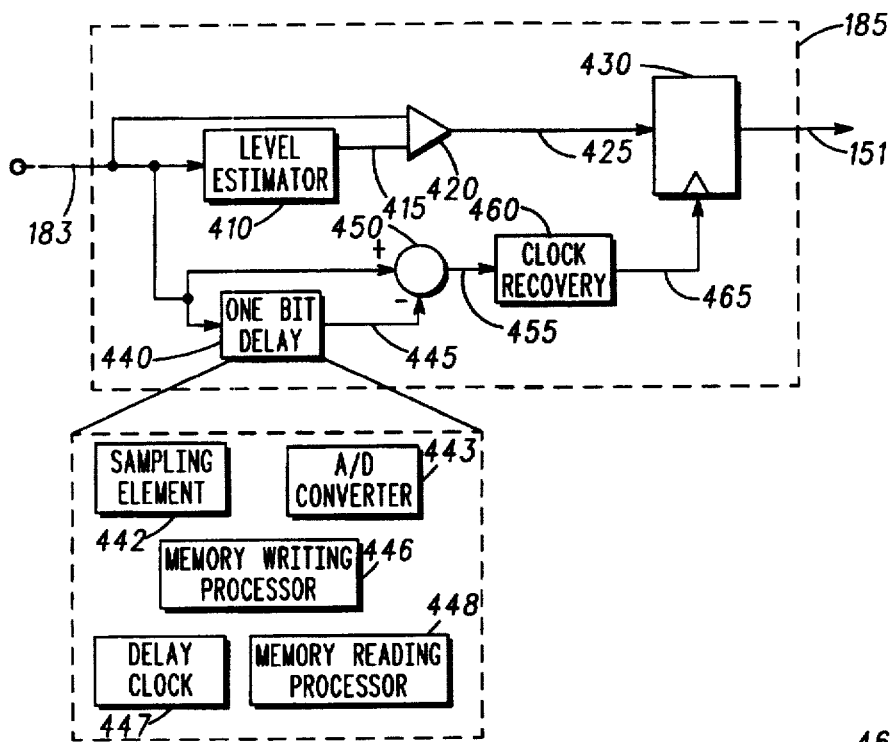
FIG. 4 is a more detailed diagram of a portion of the FIG. 1 system showing the operation of the Data Bit Recovery subsystem in accordance with a preferred embodiment of the present invention.

In order to overcome the difficulties noted above, a detail of the Data Bit Recovery (185) subsystem of the present invention is shown in FIG. 4. Here the received waveform from the Transceiver (at 183) is routed to the reference Level Estimator (410). This Level Estimator may employ any of several well known techniques, for example, "DC Restoration Amplifier with Automatic Zero Offset Adjustment", Chapman, U.S. Pat. No. 3,846,710. The output of the Level Estimator (415) is the estimate of the center reference level of the data waveform, and in the best case, this level estimate will converge on the ideal reference level (240). The received waveform (183) is compared against this estimated reference level (415) by level comparison device (420). The resulting level decision (425) is the estimate at any instant of time of the received waveform relative to the reference estimate, and hence is the estimate at any instant of time of the data value.

However, in realizable band limited systems, this estimate is not an accurate estimate of the instantaneous data value at all instants, but is only accurate near the region of relative waveform stability residing between waveform transitions. It is further necessary for the Data Bit Recovery subsystem to make an accurate estimate of the periodic occurrence of these stable regions. To perform this clock recovery it is sometimes sufficient to use the periodic or quasi-periodic zero crossings of the received waveform, but as we have discussed in reference to the FIG. 3 eye pattern, the best zero crossing information we have has been corrupted by the transient error distortion.

Improved clock estimation can be achieved by routing the received waveform (183) to a One Bit Delay element (440), and subtracting the result from the original waveform using Subtractor (450). This One Bit Delay element can be realized in many ways, such as charge coupled delay lines, acoustic wave delay elements, or, more commonly, as part of a computer or logic implementation comprised of a sampling element (442), an analog to digital converter (443), a memory writing processor (446), a delay clock (447) and a memory reading processor (448). The Subtractor can be implemented by commonly known analog means, or also as part of arithmetic logic. The output of the Subtractor (455) is then fed to conventional timing recovery circuitry (460), such as a phase locked loop. This timing recovery circuitry provides additional filtering to remove noise jitter in the recovered clock, and may provide additional processing, such as early/late rejection to further qualify the clock estimate. The recovered clock provides an estimate for the instant of time when the received waveform is in a stable region accurately reflecting the desired data value. The level decision (425) is sampled at this clock time (465) by sampler (430). The resulting best estimate of the recovered data is then present at the output (151).

Figure 5:
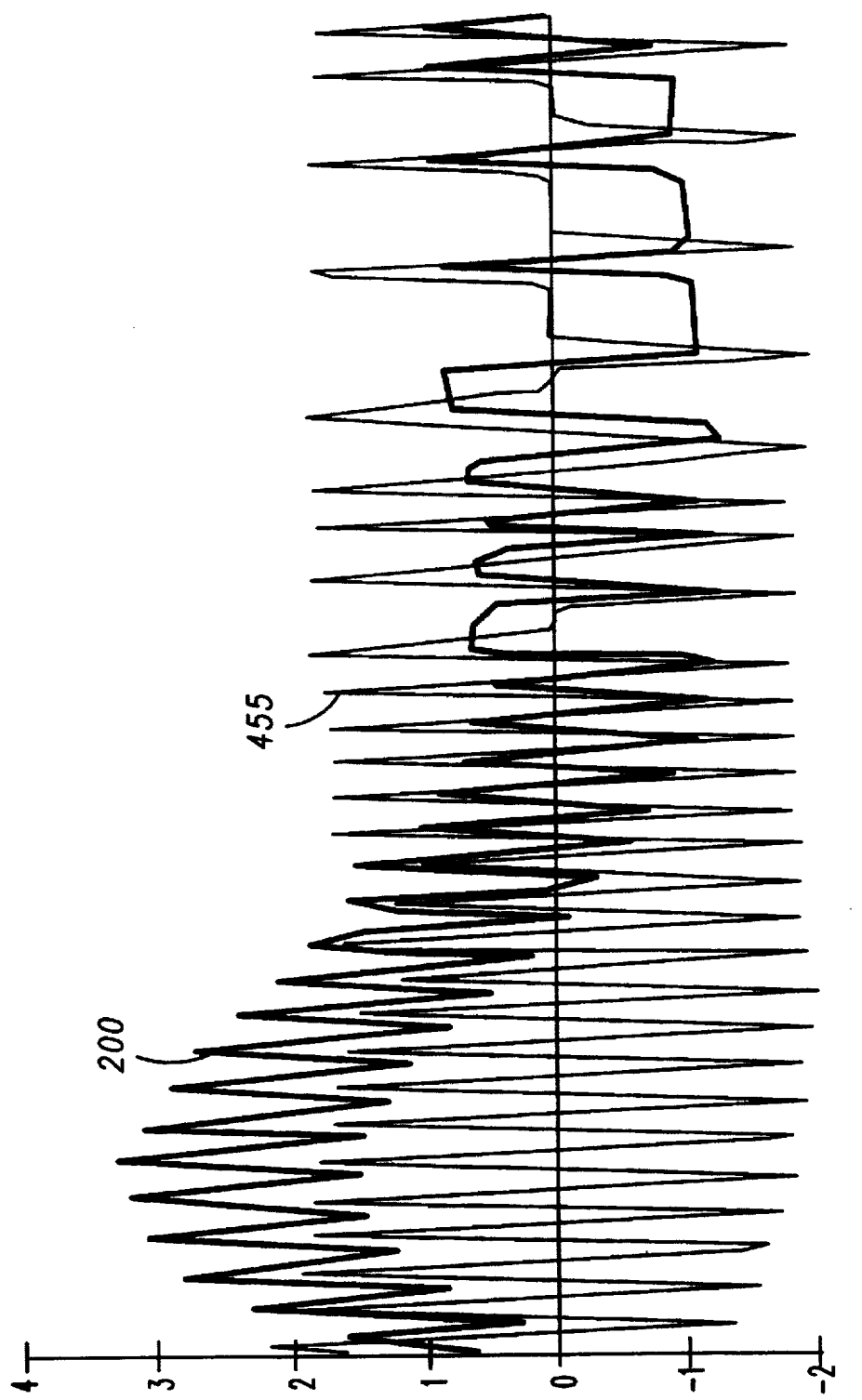
FIG. 5 shows the output of the differential timing recovery subsystem of FIG. 4 superimposed on FIG. 2, illustrating the effectiveness of the present invention in identifying the zero crossing timing synchronization with moderate transient error distortion.

FIG. 5 shows the output of the Subtractor (450 at 455), superimposed on the original received waveform (200). It can be appreciated that the zero crossing of this subtracted waveform occur at nearly the same instants as the zero crossings of the original undistorted waveform (122) , as long as the error transient is slowly changing with respect to the data zero crossings. This can be understood by considering that the output of the Subtractor (at 455) is at a maximum positive value at the instant of time when the received waveform is at its maximum peak, and exactly one bit previous, the received waveform was at its minimum peak. Likewise, the output of the Subtractor is at its maximum negative value at the instant of time when the received waveform is at its minimum peak, and exactly one bit previous, the received waveform was at its maximum peak. Therefore, a zero crossing of the Subtractor output must occur substantially halfway between any 0→1 or 1→0 transition of the data waveform. With a predictable bit pattern as used for bit sync preamble, these zero crossings of the subtracted waveform are much more accurate, particularly during high transient error conditions, than the zero crossings of the raw received waveform, and can be used to provide reliable input to the phase locked loop timing recovery circuitry much earlier in the data packet than possible with conventional means. The advantages of the present invention become even more apparent in reference to FIG. 6 and eye pattern illustrated in FIG. 7, showing a received waveform (600) having a substantially larger transient error than the previous example, such that the received eye pattern in the region of the wordsync interval is completely obscured. The subtracted waveform (655), however, still exhibits very usable zero crossing behavior.

A preferred embodiment of the present invention utilizes the one bit delay and subtract elements (440 and 450) to enhance the timing clock recovery in a data Receiving Terminal in a packet data system having a known predictable bit synchronization preamble. The astute will observe that for bit sync preambles, or ordinary random data, other than pure alternating 1's and 0's, the output of the subtractor will have additional zero crossings, or dwells near zero, due to two or more bits being consecutively near maximum or minimum. Furthermore, for the severely distorted case depicted in FIGS. 6 & 7, it can be noted that the transient error is substantially greater than the data excursion during critical portions of the packet, such that the level comparison device (420) will provide an erroneous level decision (at 425). These difficulties would seem to limit the applicability of the present invention. However even the simple system described here offers a substantial improvement in existing data communications systems, such as Cellular Digital Packet Data, which employ alternating bit sync, preamble and low transient error as part of the system specification.

Alternative embodiments of the present invention can employ additional elements to overcome the known difficulties. The problem of additional zero crossings in the subtracted waveform can be resolved in a number of ways. Regardless of the pattern of 1's and 0's in the data waveform, as long as there are sufficient transitions, the subtracted waveform (at 465) will have a substantial zero crossing component at the desired zero crossing locations, allowing the clock recovery (460) phase locked loop to acquire synchronization. This problem reduces to finding an appropriate strategy for preventing the clock recovery element from false locking on the wrong zero crossings. Once correctly locked, by whatever method, correct lock can be maintained by early/late techniques which discard zero crossings which occur outside an acceptable time window. Initial correct lock can easily be achieved in systems employing alternating preamble. Even in systems that do not employ alternating preamble to facilitate initial lock, false zero crossings at the output of the subtractor can be rejected by observing the subtractor values exactly one half bit time prior to and after the candidate zero crossing. These values should alternate in sign, and each be of large magnitude (approaching the peak-to-peak magnitude), else the zero crossing should be rejected.

The enhancement of observing the subtractor with a 2-threshold decision one half bit time prior to the zero crossing estimate can also be used to address the problem of very large transient errors (such as depicted in FIGS. 6 & 7) causing incorrect level decisions (at 425). A very large positive value will indicate a 0→1 data transition, a very large negative value will indicate a 1→0 transition, while an intermediate value will indicate unchanging data. Thus the subtractor output functions as a differentiator on the data waveform, and an estimate of the actual data values can be obtained by integrating the subtractor output.

Figure 8:
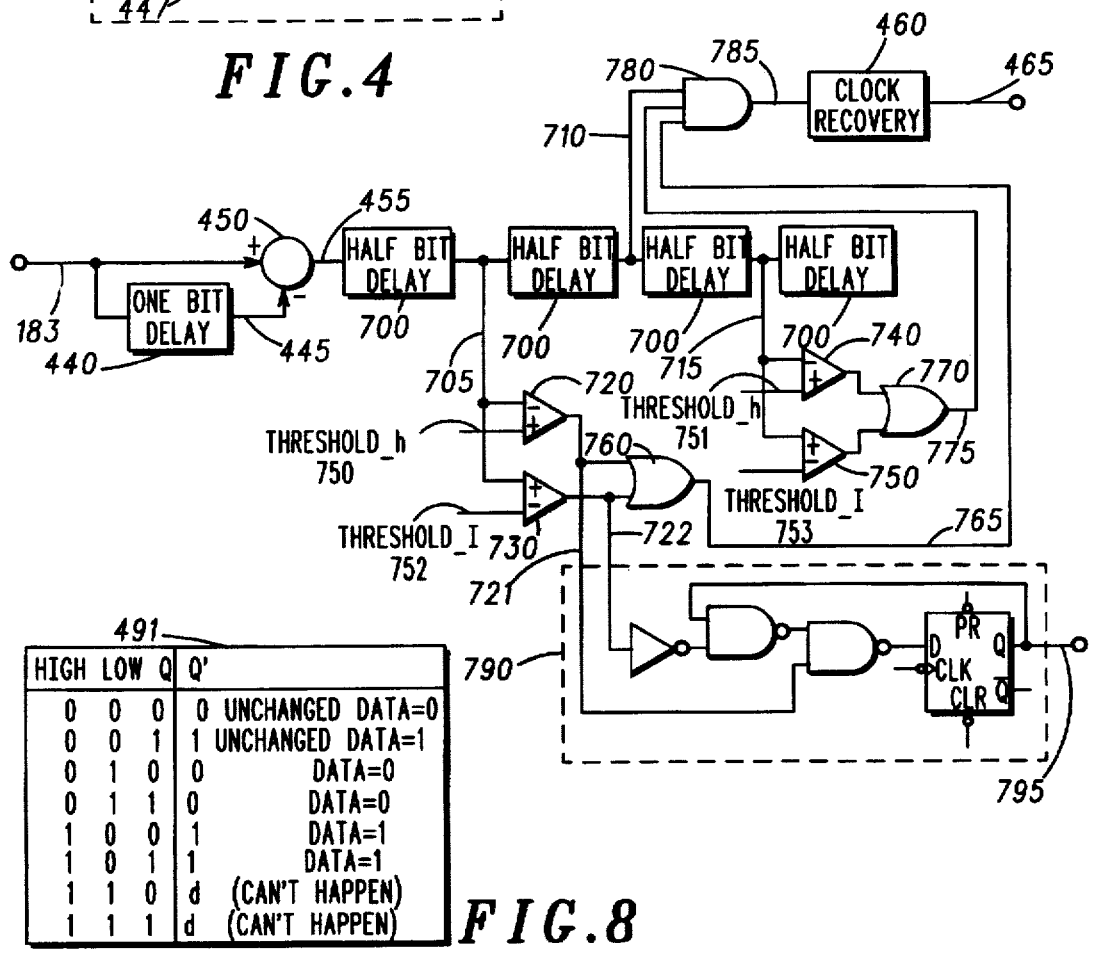
FIG. 8 illustrates an alternative preferred embodiment of the present invention.

Referring now to FIG. 8, a preferred embodiment of the present invention is illustrated. In this preferred embodiment, by way of example, an enhanced detector is illustrated. Included in this preferred embodiment is the received waveform (183), the One Bit Delay (440), subtractor (450), and Clock Recovery (460) described earlier. Here, between the Subtractor output (at 455) and the Clock Recovery input (at 785), Qualification Circuitry has been added to reject zero crossings of the Subtractor Output which do not meet sufficient selection criteria. Here, a plurality of delay elements (700) have been introduced, such that the output of the Subtractor can be tested one half bit time before (at 705) and one half bit time after (at 715) the instant of time being monitored by the Clock Recovery circuit (at 710). Comparator circuitry (720, 730, 740, and 750) test the values present at these ½ bit early and ½ bit late instants against a high threshold (750, 751) and a low threshold (752, 753). These Comparator circuits, coupled to logic circuitry (760, 770) indicate (at 765 and 775) if large changes have occurred in the Subtractor output, indicating that a data bit transition has occurred. We would not want to use any zero crossing of the Subtractor output to update the Clock recovery circuit if such a data bit transition is not indicated. Logic Gate (780) blocks or passes any information being presented to the Clock Recovery circuit according to the transition indications (at 765, 775).

The outputs of the Comparator circuits that indicate High values of Subtractor output (at 721), and Low values (at 722) can be used to make an estimate of the received data value, which during occurrences of high received waveform transient error, will be improved over estimates obtained by conventional means (at 425). The High and Low decisions are fed to Logic circuit (790), which acts as a simple saturating integrator. The truth table of this logic circuit is given in 491. The output of this Logic circuit (at 795) can be used as a received data bit estimate during instances of high transient error when the conventional estimate (at 425) is unreliable (as in the high error case depicted in FIGS. 6 & 7).

The above described embodiments of the present invention disclose preferred embodiments of a highly inventive apparatus and preferred methods for eliminating transient error on data waveform reception. It will be apparent to those skilled in the art that the disclosed invention may be modified in numerous ways and may assume many embodiments other than the preferred forms particularly set out and described above. Accordingly, it is intended by the appended claims to cover all modifications of the present invention that fall within the true spirit and scope of the present invention and its equivalents.

I claim:

1. An apparatus comprising:
    a received waveform containing an information signal encoded at periodic time instants of a known period for eliminating an undesired amplitude error in said received waveform where said undesired amplitude error is slowly varying with respect to said known period and recovering a desired periodic time instants:
    a delay element for delaying said received waveform, to provide a delayed waveform, by an amount equal to said known period;
    a subtracting element for comparing said received waveform with said delayed waveform, and providing a timing recovery signal with zero crossing substantially less corrupted by said undesired amplitude error; and
    averaging circuitry, said averaging circuitry operating on said timing recovery signal for purposes of recovering said desired periodic time instants.

2. The apparatus of claim 1, wherein the information signal is comprised of data levels varying about a center reference.

3. The apparatus of claim 1, wherein the information signal is comprised of binary data levels equally offset about a center reference, with a bitsync preamble consisting of alternating values.

4. The apparatus of claim 1, wherein said delay element further comprises:
    a sampling element;
    an analog to digital converter;
    a memory writing processor;
    a memory reading processor; and
    a delay clock.

5. The apparatus of claim 1, wherein the subtracting element includes a computing arithmetic logic circuitry.

6. The apparatus of claim 1, wherein the averaging circuitry comprises a phase locked loop, said phase locked loop providing filtering and jitter removal on said zero crossings.

7. The apparatus of claim 1, wherein the averaging circuitry establishes the timing recovery signal based on alternating preamble, and then excludes zero crossings that occur outside a predetermined threshold of the zero crossing instants.

8. The apparatus of claim 1, wherein the known period is a predetermined selectable threshold.

9. An apparatus comprising:
   an information signal encoded at periodic time instants of a known period in a received waveform, for eliminating an undesired amplitude error in said received waveform where said undesired amplitude error is slowly varying with respect to said known period and recovering a desired periodic time instants:

a microprocessor having:
      a delay element for delaying said received waveform, to provide a delayed waveform, by an amount equal to said known period: and
      a subtracting element for comparing said received waveform with said delayed waveform, and providing a timing recovery signal with zero crossing substantially less corrupted by said undesired amplitude error; and averaging circuitry, said averaging circuitry operating to reduce jitter in said timing recovery signal for purposes of recovering said desired periodic time instants.

* * * * *